BISTABLE SEMICONDUCTIVE GLASS COMPOSITION

Filed Dec. 20, 1966

| PART | VALUE |
|---|---|
| $C_1$ | 8 µf |
| $C_2$ | 8 µf |
| $R_1$ | 100K |
| $R_2$ | 2.2K |
| $R_3$ | 100K |
| $R_4$ | 15 K |
| $R_5$ | 4.3K |
| $R_6$ | 6.8K |
| $RL_1$ | 2 m Sec. TO OPERATE POTTER AND BRUMFIELD FC11D |
| $RL_2$ | 10 m Sec. TO OPERATE POTTER AND BRUMFIELD KC P11 (2.5K RESISTANCE) |

INVENTORS.
DANIEL J. SHANEFIELD
EMERY W. CURRIER
PAUL E. LIGHTY
BY Arthur L. Lessler
ATTORNEY 3,498,930

BISTABLE SEMICONDUCTIVE GLASS COMPOSITION

Daniel J. Shanefield, New York, N.Y., and Emery W. Currier, Bloomfield, and Paul E. Lighty, Lafayette, N.J., assignors to International Telephone and Telegraph Corporation, Nutley, N.J., a corporation of Maryland Filed Dec. 20, 1966, Ser. No. 603,214
Int. Cl. H01c *7/00;* C04b *35/00;* C03c *3/30*
U.S. Cl. 252—512 2 Claims

ABSTRACT OF THE DISCLOSURE

A semiconducting glass having compositions within the ternary group thallium-tellurium-germanium, consisting essentially of approximately 3 to 21% by weight of thallium, 68 to 90% by weight of tellurium and 3 to 16% by weight of germanium. These compositions have two stable physical states, one characterized by a relatively high electrical resistance and the other characterized by a relatively low electrical resistance. The compositions are capable of being electrically switched between these two resistance states.

RELATED APPLICATIONS AND PATENTS

Figure 1:
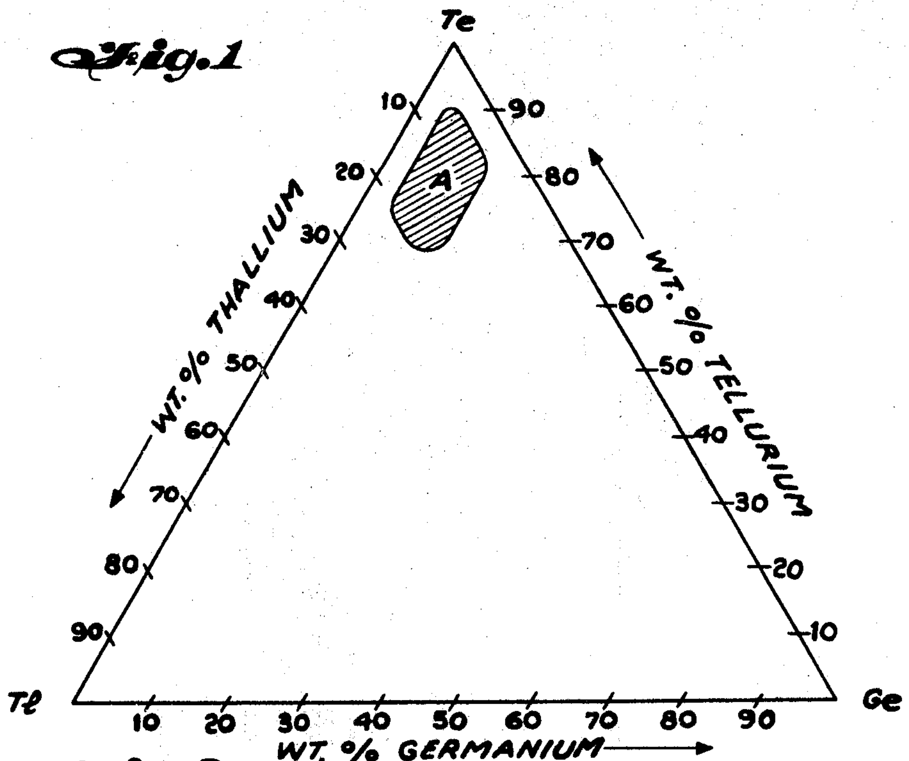

The semiconducting glasses described herein are generally related to the materials and devices described in U.S. Patent Nos. 3,117,013, 3,241,009, and 3,271,591, as well as U.S. patent application Nos. 537,187 (filed Mar. 24, 1966), now U.S. Patent 3,418,619, and 557,944 (filed June 16, 1966), now U.S. Patent 3,448,302, both said applications being assigned to the assignee of the instant application.

BACKGROUND OF THE INVENTION

This invention relates to the field of semiconducting glasses and more particularly to glasses having two or more electrically selectable physical states characterized by substantially different values of bulk resistivity.

Glassy semiconductive materials which exhibit two or more stable physical states having different electrical characteristics are well known in the art. These states are characteristic of the bulk of the material, the devices embodying such materials being non-rectifying and capable of being electrically switched between the various states thereof. Since the resistance of the material in one physical state is substantially different from its resistance in another state, such devices are utilizable as non-rectifying switching elements, suitable for AC as well as DC operation.

What are presently believed to be the physical phenomena involved in the electrically inducible physical state changes exhibited by these materials are described in detail in copending application Nos. 537,187 and 557,944. Briefly, however, it is believed that one physical state of the material is characterized by a relatively high resistance non-crystalline (perhaps locally ordered but macroscopically amorphous or polycrystalline) bulk structure, while the other state is characterized by a relatively low resistance crystalline structure.

Bistable devices incorporating such semiconducting glasses are described in the aforementioned patents and applications, and generally comprise a mass of the semiconducting glass (in its non-crystalline or glassy state) contacted by a pair of spaced electrodes. A suitable electrical control signal applied to the electrodes produces thermal and/or electrical field effects which cause a portion of the semiconductor material to crystallize to form one or more conductive filaments thus providing a relatively low resistance crystalline path between the electrodes. It has been found that due to the formation of microcracks in the relatively thin crystalline filament(s), there is a tendency toward impairment of the low resistance crystalline filamentary path often resulting in spontaneous "turn off" or reversion to the high resistance state between the device electrodes.

Moreover, it has been found that glasses of the ternary group arsenic-tellurium-iodine disclosed in U.S. Pat. Nos. 3,117,013 and 3,241,009 tend to exhibit chemical instability with time due to (i) a hydrolytic reaction of the iodine composition with atmospheric water, and (ii) evaporation of some of the iodine composition during the passage of electric current through the material.

Accordingly, an object of the invention is to provide bistable semiconductor glass compositions which are chemically stable and do not exhibit spontaneous changes in resistance. The invention herein is based upon the provision of novel semiconducting bistable glass compositions of the ternary group thallium-tellurium-germanium, such glasses exhibiting improved chemical and electrical stability over those bistable semiconducting compositions heretofore known.

IN THE DRAWING

Figure 2:
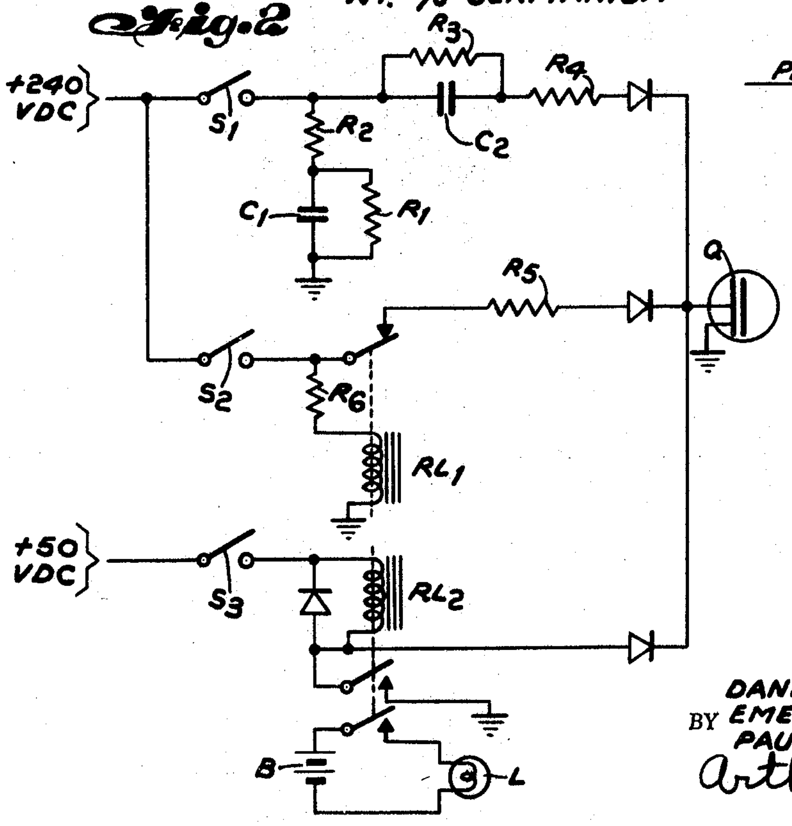

FIG. 1 shows a ternary diagram indicating the range of compositions according to the invention; and FIG. 2 shows typical circuitry for operating a bistable non-rectifying semiconductor device employing a semiconducting glass have a composition according to the invention.

DETAILED DESCRIPTION

FIG. 1 shows a ternary diagram for the novel range of compositions which applicants have discovered provide unexpectedly advantageous results over prior art materials when employed as bistable non-rectifying semiconductor elements, the compositions of this invention (by weight) being indicated by the shaded area A. Samples of compositions prepared for the purpose of obtaining this diagram were obtained by the following technique.

Starting materials for the preparation of these glasses consisted of high purity thallium, tellurium and germanium. Samples were prepared in clear fused quartz vials having the approximate dimensions of 5/16" inside diameter by 6" long. The weights of the elements required to form a product of a given composition were calculated so that after reaction the product would just fill a bulb at the bottom of the vial. The required quantities of thallium, tellurium and germanium were weighed out in a dry nitrogen atmosphere and transferred to the quartz vial. The vial was then evacuated and sealed with a hydrogen torch. The sealed quartz vial was then placed inside a steel bomb with loosely fitting but securely fixed end caps. The bomb was then heated at 900° C. for 12 hours in a horizontal furnace having a combustion tube which rotated about its own axis during the firing. After the reaction, the bomb and its contents were allowed to cool in a vertical position so that the majority of the products would solidify in the bulb at the bottom of the vial. After cooling, the vial was removed from the steel bomb and small quantities of materials which had condensed in the upper portion of the tube were forced down into the bulb by heating the tube with a hydrogen torch. The tube was heated with a small hydrogen flame at a point just above the bulb until it collapsed and sealed. The tube above the collapsed portion was then drawn off and the section of the vial containing the product was then reheated in the steel bomb for a further 2 hours at 900° C. in the rotating tube furnace. After firing, the bomb and its contents were allowed to air cool to room temperature.

A sample of the material was then utilized in fabrication of a bistable memory device by applying electrodes thereto in the manner described in U.S. Pat. No. 3,241,-009 commencing at column 5, line 30 thereof. After "forming" the device in the manner described in column 5, commencing at line 69 of U.S. Pat. No. 3,241,009, it was discovered that compositions according to the present invention appeared to be electrically stable, and did not exhibit the spontaneous changes in resistance characteristic of bistable semiconducting glasses heretofore known.

Compositions according to the invention may be operated as bistable non-rectifying memory devices in the general manner described in U.S. Pat. No. 3,241,009, the electrical characteristics of devices employing compositions according to the invention being qualitatively similar to those of the device described in U.S. Pat. No. 3,241,-009.

We have also discovered that it is preferable to employ iron, nickel or tungsten as the materials which comprise the electrodes contacting the bistable semiconductor material of the invention. These particular metals seem to provide minimal deleterious interaction with the active semiconductor material, whereas it was found that other electrode materials (especially copper) tended to degrade the stability of the fabricated devices.

FIG. 2 shows a typical circuit for operating bistable non-rectifying semiconductor devices according to the invention. Momentary closure of switch S1 serves to "turn on" the bistable semiconductor device Q (constructed according to the invention), i.e. to cause the device to assume its "on" or relatively low resistance state. Momentary closure of switch S2 serves to cause the device to revert to its "off" or relatively high resistance state. Momentary closure of switch S3 serves to "interrogate" the device Q, i.e. to indicate by means of the lamp L whether the device Q is in its high resistance or low resistance state. The composition preferred for operation with the circuitry shown in FIG. 2 is 10% thallium, 82% tellurium, and 8% germanium (by weight).

We claim:

1. A semiconducting glass consisting essentially of thallium, tellurium and germanium having a composition, by weight, within the shaded area A in FIG. 1 of the drawing.

2. A semiconducting glass according to claim 1 having a composition consisting essentially of, by weight, 10% thallium, 82% tellurium and 8% germanium.

References Cited

UNITED STATES PATENTS

| | | | |
|---|---|---|---|
| 3,241,009 | 3/1966 | Dewald et al. | |
| 3,271,591 | 9/1966 | Ovshinsky. | |
| 3,343,972 | 9/1967 | Hilton et al. | 106—47 |

HELEN M. McCARTHY, Primary Examiner

U.S. Cl. X.R.

106—47; 252—518; 307—324; 317—324